INVENTORS
ALWIN KOST
GINO QUILICI
RALPH E. BOYD
BY Fred C. Matheny
ATTORNEY

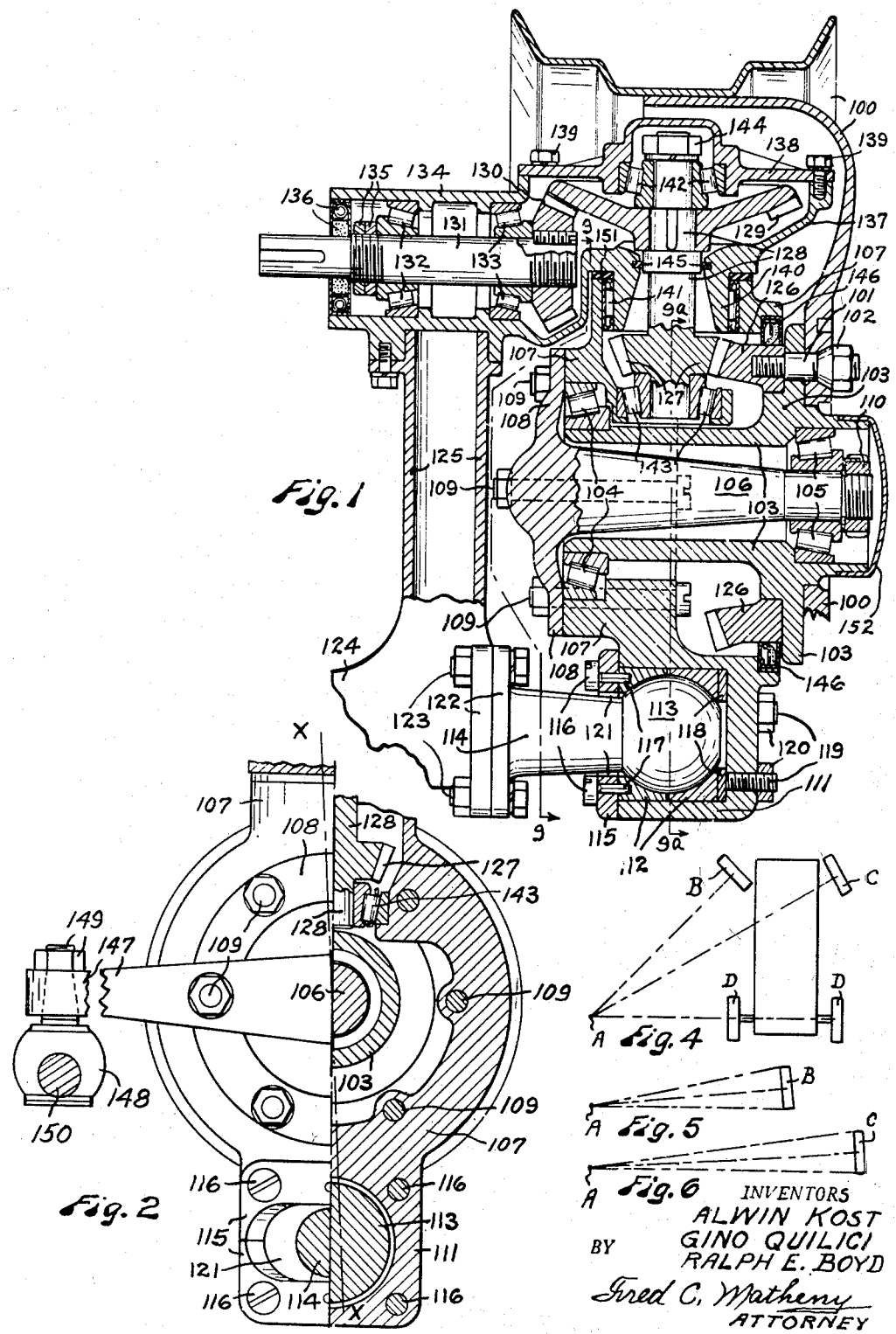

United States Patent Office 2,817,407
Patented Dec. 24, 1957

2,817,407

MOTOR VEHICLE WHEEL MOUNTING AND DRIVING MEANS

Alwin Kost and Gino Quilici, Portland, Oreg., and Ralph E. Boyd, Oakland, Calif., assignors to Kost Multiple X, Inc., Portland, Oreg., a corporation of Oregon Original application September 5, 1951, Serial No. 245,172. Divided and this application January 18, 1954, Serial No. 404,428

2 Claims. (Cl. 180—48)

This invention relates to motor vehicle wheel mounting means of the type disclosed in the two prior patents of Alwin Kost, No. 2,285,445 and No. 2,373,834, and in the patent of Alwin Kost and Gino Quilici, No. 2,631,867, and this application is a division of our application Serial Number 245,172, filed Sept. 5, 1951, and since abandoned.

An object of this invention is to improve the construction of wheel mounting means of the class described in the prior patents hereinbefore referred to.

Another object of this invention is to provide strong, simple and efficient wheel mounting means which will tilt or bank the two front wheels of a motor vehicle when the vehicle is being steered around a curve, thereby placing the wheels in a better position to resist side thrust and to resist skidding on slippery surfaces when the vehicle is being turned.

When a moving vehicle is being turned on a roadway, a portion of the momentum of said vehicle is exerted as a transverse thrust on the front wheels of the vehicle. This sometimes results in damaged or broken wheels and may be the cause of an accident. Also it makes necessary slower speed on curves. It is an object of this invention to provide a wheel mounting means by which the wheels of a vehicle will be angularly moved into positions best calculated to resist strains and thrusts, due to turning of the vehicle, and by which maximum stability on curves is obtained, thereby minimizing lurching and swaying and skidding of the vehicle and providing greater safety and greater riding comfort.

Other objects are to provide wheel mounting means which will reduce accidents, increase the useful life of wheels, axles, motors and other vehicle parts, provide better and easier steering, give better road adherence and thus reduce the danger of skidding and make possible faster speed on curves with greater safety.

Another object of this invention is to provide a front wheel mounting means in which a driving torque may be applied to front vehicle wheels which are mounted for steering and banking movement.

Other objects of this invention will be apparent from the following description taken in connection with the accompanying drawings.

In the drawings:

Figure 1 is a view partly in elevation and partly in vertical axial section showing a front wheel which is mounted for steering and banking movement and which further has power transmitting means connected therewith.

Fig. 2 is a fragmentary sectional view in which the left half is shown in elevation substantially on broken line 9—9 of Fig. 1 and the right half is shown in section substantially on broken line 9a—9a of Fig. 1.

Figs. 4, 5 and 6 are diagrammatic views illustrating the operation of front wheels mounted in accordance with this invention.

Like reference numerals indicate like parts throughout the several views.

Figure 3:
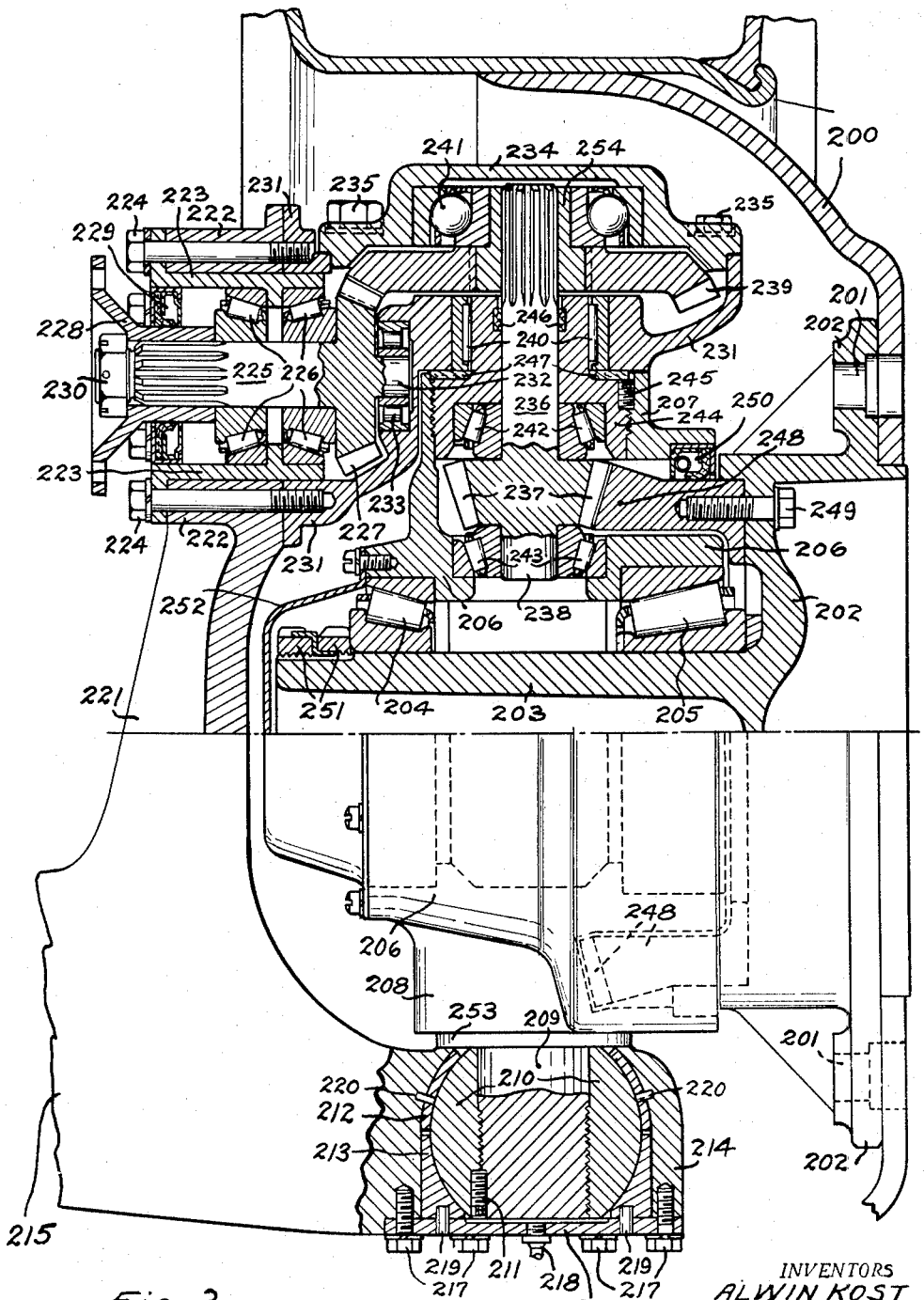
Fig. 3 is a vertical sectional view, with parts in elevation, showing another form of the invention having means to apply driving torque to a wheel which is mounted for steering and banking movement.

Figs. 1 and 2 show an embodiment of this invention in a wheel to which driving torque is applied. This construction shows a front vehicle wheel provided with speed reduction gear means for applying driving torque and mounted so that it is easily steered while being driven and will be banked when angularly moved in steering so as to best withstand the loads and thrusts to which it is subjected and to best resist skidding on slippery surfaces when negotiating turns.

The wheel mounting and driving means shown in Figs. 1 and 2 comprises a wheel 100 secured by bolts 101 and nuts 102 to a rotatable hub 103. The hub 103 is rotatively mounted by means of an inner roller bearing 104 and an outer roller bearing 105. The outer roller bearing 105 is supported on an axle 106. The inner roller bearing 104 is supported by a non-rotatable axle housing 107 which is secured to a flange 108 of the axle 106 by bolts 109. A nut 110 on the outer end of axle 106 holds the wheel and hub parts in assembled relation. A cap 152 is provided on the end of hub 103.

The lower portion of the housing 107 is shaped to form a boxing 111 for the reception of split bearing members 112 which fit over and receive a ball 113 on the end of a lower axle arm shank 114. The bearing members 112 are held within the boxing 111 by a retaining plate 115, preferably of two piece construction, which is secured to the boxing 111 by cap screws 116. Dowel pins 117 in plate 115 and bearing member 112 prevent rotation of the bearing member. A washer shaped bearing and adjusting plate 118 engages an end of the bearing part 112 remote from the plate 115 and is adjustably supported by screws 119 which are provided with lock nuts 120. This makes it possible to adjust bearings 112 to ball 113.

The shank 114 extends through an oblong opening 121, see Fig. 2, in the retaining plate 115. The vertical weight load of the vehicle is carried by the boxing 111 and parts associated therewith. The end portion of the shank 114 remote from the ball 113 is rigidly secured, as by flange means 122 and bolts 123 to a front vehicle axle 124. The axle 124 is the supporting axle for the front end portion of a vehicle and said axle 124 has an upwardly extending portion 125.

Torque power for driving purposes is transmitted to the hub 103 and wheel 100 through a bevel gear 126 which is secured to said hub 103 and wheel 100 by the bolts 101. The bevel gear 126 meshes with a pinion 127 which is rigid with a shaft 128. The shaft 128 also has a bevel gear 129 secured thereto and the bevel gear 129 meshes with a pinion 130 on a shaft 131 to which driving torque is applied. Any conventional means may be used to drive the shaft 131. The shaft 131 is journaled in roller bearings 132 and 133 disposed within a tubular housing 134. The housing 134 is fixedly secured to the upper end portion of the upright axle stem 125. Lock nuts 135 on shaft 131 cooperate with pinion 130 to prevent endwise displacement of the shaft 131 and to hold said shaft and the bearings 132 and 133 and housing 134 in assembled relation. An oil seal ring 136 is provided in housing 134 outwardly from nuts 135.

An extension 137 of the housing 134 provides a receptacle for the bevel gear 129 and a cap or cover 138 is secured, as by cap screws 139, to the upper end portion of said extension 137. A cylindrical hub 140 of the extension 137 protrudes downwardly into the upper end portion of the housing member 107 and a needle bearing 141 is provided between these two parts. The housing 134 with its extension 137 and hub 140 serve as an upper axle arm which is vertically spaced above the lower axle arm formed by shank 114 and ball 113. The needle bearing 141 functions as a pivot means positioned above the axis about which the wheel rotates and the housing 103, to which the wheel is attached, moves angularly about needle bearing 141 and ball 113 when the vehicle is steered. The axis common to needle bearing 141 and ball 113 is inclined rearwardly from the lower portion upwardly, as indicated by broken line X—X in Fig. 2, to properly bank the wheel 100 when it is angularly moved for steering purposes.

A roller bearing 142 in the cap 138 supports the upper end portion of the shaft 128 and another roller bearing 143 carried by the housing 107 supports the lower end portion of said shaft 128. A lubricant retaining ring 145 is provided between hub 140 and shaft 128. Another lubricant retaining ring 146 is provided between the periphery of bevel gear 126 and the housing 107. Also another lubricant retaining ring 151 is provided between housing 107 and extension 137.

A steering arm 147, Fig. 2, is integral with or rigidly secured to the axle member 106 and flange 108 and extends sidewise therefrom. A steering control socket 148 is secured to the outer end portion of the steering arm 147 by bolt and nut means 149. A tie rod 150 is connected with the socket 148 for imparting steering movement.

The construction of Figs. 1 and 2 provides for easy and uniform and efficient steering of a front vehicle wheel to which driving torque is being applied. It also provides a structure which is highly resistant to skidding, which has great stability on curves and turns and which minimizes wear on tires and mechanical parts. The vertical weight load is carried by the ball 113 and the needle bearing 141 acts as a pivot in steering. The upright axis common to the ball 113 and bearing 141 is inclined rearwardly from lower to upper portion thereof to provide proper banking of the wheels. When two front wheels mounted by means as shown in Figs. 1 and 2 are angularly moved in steering they will be banked into the turn so that each wheel describes a cone, the apex point of which is the same for both front wheels and is in line with the axis of the rear wheels at the ground level, as illustrated in Figs. 4, 5 and 6.

When two front wheels, mounted as shown in Figs. 1 and 2, are positioned for straight ahead driving they are kept in proper alignment by the ball 113 and bearing 141 and the tie rod means. Each wheel is centered with the ball 113 and bearing 141 and there is little strain on the tie rod means. When such wheels are pivotally moved by the tie rod means, in steering, they will not be moved about a vertical axis but will be moved about the inclined axis of the ball 113 and bearing 141, which axis is slightly inclined rearwardly, upwardly considered and said wheels will inclined or bank toward the turn. This incline properly banks the wheels to withstand the inertia of the body parts as the turning takes place and to better resist skidding on slippery surfaces. Due to the fact that the front wheels are pivoted on axes which are inclined rearwardly from the lower portion upwardly there will be caster effect tending to return the wheels from an inclined turning position back to a straight ahead position.

The amount of tilt imparted to each wheel is proportional to the angle through which the wheel is moved away from the straight ahead steering position. As the inner front wheel will take a sharper angle than the outer front wheel in making a turn it will be evident that the inner front wheel will be tilted a greater amount than the outer front wheel.

This is illustrated diagrammatically in Figs. 4, 5 and 6. Fig. 4 illustrates a motor vehicle which has its front wheels angularly moved through a maximum angle for making a short left turn. The pivot point A about which both front wheels B and C move is on the projected axis of the rear wheels D and to accomplish this it is apparent that the front wheel B nearest to the point A will have to be angularly moved through a greater angle from the straight ahead position than will the front wheel C which is farthest from the point A. Fig. 5 illustrates the tilt of the wheel B nearest the point A and Fig. 6 illustrates the lesser tilt of the wheel C, both for a sharp left turn as illustrated in Fig. 4. Thus it will be seen that the wheel B is tilted or banked a greater amount than the wheel C in making a left turn and it will be understood that the wheel C is tilted or banked a greater amount than the wheel B in making a right turn.

The gears 130, 129, 127 and 126, shown in Figs. 1 and 2, provide a substantial gear reduction and make it possible to substantially reduce the size of differential gears through which power is transmitted to the shaft 131.

Fig. 3 shows another embodiment of this invention in a front vehicle wheel to which driving torque may be applied and steering and banking movement imparted.

The apparatus of Fig. 3 comprises a wheel 200 secured as by bolt means applicable to holes 201 to a flange 202 of a rotatable hub member 203. The hub member 203 is rotatively mounted as by an inner roller bearing 204 and an outer roller bearing 205. The outer roller bearing 205 carries a major portion of the horizontal thrust. The outer roller bearing 205 is preferably larger than the inner bearing 204. The weight load is about equally divided between the bearings 204 and 205. Nuts 251 are provided on the end portion of the hub 203 to adjust and hold the bearings 204 and 205. A cap 252 on the end of a housing 206 covers nuts 251 and bearing 204 and hub 203. Both of the roller bearings 204 and 205 are supported within the non-rotatable axle housing 206. The axle housing 206 has an upwardly directed tubular extension 207 and an oppositely positioned downwardly directed boss 208. A threaded cylindrical stud 209 is rigid with and extends downwardly from the boss 208 and a ball 210 is threaded onto the said stud 209. A screw 211 may be used to lock the ball 210 on the stud 209. The ball 210 fits movably within two bearing members 212 and 213 and these bearing members are supported within a suitable cavity in a lower axle arm 214 of a front vehicle axle 215. A cover plate 216 is secured by cap screws 217 to the axle arm 214. A grease fitting 218 is carried by the cap 216. Preferably pins 219 extend through cover 216 and into bearing member 213 to prevent rotation of bearing member 213. Also preferably other pins 220 are provided to prevent rotation of upper bearing member 212. A sealing ring 253 is provided between the lower end of boss 208 and the adjacent part of the axle arm 214.

The vehicle axle 215 has an upwardly extending arm 221 which terminates in a cylindrical receptacle 222. A flanged tubular bearing housing 223 fits within the receptacle 222 and is secured thereto by bolts 224. The non-flanged end portion of the housing 223 extends beyond the adjacent end of the receptacle 222 to provide a guide and positioning member, as hereinafter explained.

A splined stub shaft 225 extends through the bearing housing 223 and is rotatively supported therein by preferably two roller bearings 226. A bevel pinion 227 is rigid with the inner end portion of shaft 225. A flanged universal joint type coupling member 228 fits over the splined end portion of the stub shaft 225. A lubricant retaining ring 229 is provided within the bearing housing 223 around the coupling member 228. A nut 230 on the end of shaft 225 holds parts 225 to 229 inclusive in assembled relation.

A gear housing 231 fits over the protruding end portion of the bearing housing 223 and is secured to the cylindrical receptacle 222 and axle arm 221 by the bolts 224. The gear housing 231 extends outwardly from the upright axle arm 221 and functions as a horizontal uppermost axle arm spaced vertically from the lowermost axle arm 214. An extension 232 of the shaft 225 is journaled in a pilot bearing 233 which is supported in the gear housing 231.

A removable cap 234 is secured to the upper end portion of the gear housing 231 by cap screws 235. The gear housing 231 registers with the upper end portion of the tubular housing extension 207. A tubular fitting 244 is threaded into the upper end portion of the axle housing extension 207 and is secured thereto by a locking screw 245.

An upright splined shaft 236 having a bevel pinion 237 thereon is disposed within the housing 231 and fitting 244 and extension 207. An extended portion 238 of the shaft 236 protrudes downwardly from bevel pinion 237. A bevel gear 239 having a hub 254 is mounted on the upper splined end of the shaft 236 and meshes with the bevel pinion 227. A needle bearing 240 is provided between the tubular fitting 244 and the gear housing 231. The axis of the bearing 240 coincides with the medial plane of the wheel 200. A bearing 241 for the bevel gear 239 fits over the hub 254 of said bevel gear. The hub 254 fits over the splined portion of the shaft 236. Bearings 242 and 243 are provided for the shaft 236 and shaft extension 238 above and below the pinion 237 respectively. The bearings 241 and 242 and 243 are each combined radial and thrust bearings. The needle bearing 240 is a radial bearing and is the upper pivot bearing about which steering movement takes place. Preferably two lubricant retaining rings 246 and 247 are provided in connection with the tubular fitting 244.

The pinion 237 meshes with a bevel gear 248 which is secured by screws 249 to the flange 202 of the rotating hub 203. A lubricant retaining ring 250 is provided between the exterior of a cylindrical portion of bevel gear 248 and the interior of a cylindrical part of the non-rotatable axle housing extension 207.

A steering arm similar to the steering arm 147 shown in Fig. 2 may be integral with or rigidly secured to the non-rotatable axle housing 206 for steering purposes.

Gears 227, 239, 237 and 248 provide a substantial speed reduction in a wheel driving unit. This obviates the usual need for a substantial gear reduction in the differential gear through which torque is transmitted to a wheel and makes it possible to substantially reduce the size of the differential gears and differential housing.

In conventional front wheel mounting devices employing knuckle and king-pin mechanism the axle does not rotate and the inner races of the wheel bearings remain stationary on the axle while the outside races of the axle housing or wheel hub parts revolve. In these conventional devices the rotating housing or wheel hub which carries the wheel is substantially larger than is a rotating member of the type shown in Fig. 3 and numbered 203. This is because the conventional wheel hub must be large enough to fit over the outer races of the wheel bearings. In the device of this invention the rotating axle part 203 is relatively small in diameter. This minimizes centrifugal force in the rotating wheel hub and contributes to ease of steering.

The generally upright axis common to shaft 236 and ball 210 is inclined rearwardly of the vehicle, upwardly considered, and passes through the axis about which the wheel rotates and lies in the medial plane of the wheel. This is the axis about which steering movement takes place. When two front vehicle wheels are angularly moved about these axes in steering the vehicle the wheels are banked or inclined or compelled to lean, from top to bottom, toward the direction of the turn. Also the wheel on the inside, relative to the direction of the turn, is inclined more than the outside wheel. This unequal inclining of the wheels lowers the end portion of the axle which is innermost relative to the direction of turn more than it lowers the outermost end portion of said axle. This slightly lowers the weight of the front end of the vehicle during turning and the portion of this weight toward the direction of turn is lowered slightly more than is the portion of weight outermost relative to the direction of turn. This results in a tendency for the weight of the vehicle to return the wheels to a straight ahead position when the steering wheel is released. The banking of the wheels and the unequal lowering of the weight of the front end of the vehicle during turning are conducive to easier and better steering, reduced tire wear, less danger of blow outs, less wheel shock, less danger of skidding and better stability of the vehicle.

The two front vehicle wheels always move about the same common apex point, which corresponds to the point A, as diagrammatically shown in Figs. 4, 5, and 6. Thus a true rolling cone movement of the wheels about the same point is provided.

Each of the previously described wheel mounting structures comprises a vehicle supporting axle fixed to a vehicle and carrying the load of the front portion of the vehicle and having two vertically spaced apart axle arms or brackets rigid therewith; a non-rotatable housing part pivoted to the axle arms for steering movement and held against rotation by said arms, the steering axis being generally upright but slightly inclined rearwardly, upwardly considered, and being in the medial plane of the wheel and intersecting the axis of rotation of the wheel; wheel means rotatively supported by the non-rotatable housing part; and wheel driving devices connected with said wheel means.

The foregoing description and accompanying drawings clearly disclose preferred exemplary embodiments of this invention but it will be understood that these disclosures are merely illustrative and that changes may be made within the scope and spirit of the following claims.

We claim:

1. Mounting and driving means for a motor vehicle wheel comprising a non-rotatable vehicle supporting axle; two vertically spaced apart axle arms rigid with said axle; a housing member; ball means pivotally connecting said housing member and the lowermost axle arm providing a load carrying lower pivot bearing; tubular pivot means pivotally connecting said housing with the uppermost axle arm, the axis of said tubular pivot means being approximately vertical and being coincident with the center of said ball means and constituting a steering axis about which steering movement takes place; a wheel positioned with its medial plane coincident with said steering axis; a hub rigid with said wheel rotatively supported in said housing and extending across said steering axis with the axis about which the wheel and hub rotate intersecting the steering axis at a point which lies in the medial plane of the wheel; an upright shaft extending through said tubular pivot means; two bevel gears secured to the respective end portions of said upright shaft; another bevel gear secured to said wheel means and meshing with the bevel gear on the lowermost end portion of said upright shaft; a horizontal driven shaft journaled in said uppermost axle arm; and a pinion secured to said horizontal driven shaft and meshing with the uppermost bevel gear on said upright shaft.

2. Mounting and driving means for a motor vehicle wheel comprising a non-rotatable vehicle supporting axle having an upwardly extending rigid upper arm and an outwardly extending rigid lower arm; a horizontal housing rigid with the upper axle arm; an upright housing pivotally supported between said horizontal housing and said lower axle arm, said upright housing having an upper tubular pivot portion rotatively supported by the horizontal housing; ball and socket pivot means pivotally mounting the lower end portion of said upright housing in said lower axle arm, said ball and socket pivot means carrying the load imposed on the axle and the upper tubular pivot portion cooperating with the ball and socket pivot means in providing alignment of the upright housing, the common axis of said upper tubular pivot portion and said lower ball and socket pivot means being a steering axis and being slightly inclined rearwardly of the vehicle, upwardly considered; two wheel bearings carried by said upright housing inwardly and outwardly respectively from said upright steering axis; a hub rotatively supported by said wheel bearings with its axis of rotation intersecting said upright steering axis; a wheel rigid with said hub and positioned with its medial plane coincident with said upright steering axis; an upright shaft extending through said upper tubular pivot portion and having its axis coincident with said upright steering axis; a bearing in said upright housing rotatively supporting the lower end portion of said upright shaft; another bearing in said horizontal housing rotatively supporting the upper end portion of said upright shaft; a bevel pinion rigid with the lower end portion of said upright shaft; a bevel gearwheel rigid with said hub member and meshing with said pinion, the vertex of said bevel gearwheel and its cooperating bevel pinion being coincident with the point of intersection of the steering axis and the axis of rotation of the wheel and substantially coincident with the vertical and horizontal central axes of the wheel, the rearward incline of the steering axis, upwardly considered, providing a structure in which the driven wheel will be cambered in the direction of turn; another gearwheel secured to the upper end portion of the upright shaft; another pinion meshing with said other gearwheel; a driven shaft carrying said other pinion; and bearings carried by said upper axle arm supporting said driven shaft.

References Cited in the file of this patent

UNITED STATES PATENTS

| | | |
|---|---|---|
| 925,536 | Umholtz | June 22, 1909 |
| 996,473 | Ester | June 27, 1911 |
| 1,576,329 | Jacques | Mar. 9, 1926 |
| 1,599,614 | Frederickson | Sept. 14, 1926 |
| 1,793,091 | Hudson | Feb. 17, 1931 |
| 1,926,549 | Metz | Sept. 12, 1933 |
| 2,133,536 | Canfield | Oct. 18, 1938 |
| 2,346,143 | Asam | Apr. 11, 1944 |
| 2,503,477 | Gregory | Apr. 11, 1950 |
| 2,548,356 | Enos | Apr. 10, 1951 |

FOREIGN PATENTS

| | | |
|---|---|---|
| 124,792 | Sweden | Apr. 26, 1949 |